Jan. 20, 1970 YASUO TAKAHASHI 3,490,831
REFLECTOR LENS SYSTEM

Filed Jan. 24, 1967  3 Sheets-Sheet 1

INVENTOR.
YASUO TAKAHASHI
BY Stanley Wolder
ATTORNEY

INVENTOR.
YASUO TAKAHASHI

BY Stanley Wolder

ATTORNEY

United States Patent Office 3,490,831
Patented Jan. 20, 1970

3,490,831
REFLECTOR LENS SYSTEM
Yasuo Takahashi, Tokyo-to, Japan, assignor to Asahi Kogaku Kogyo Kabushiki Kaisha, Tokyo-to, Japan, a corporation of Japan
Filed Jan. 24, 1967, Ser. No. 611,284
Claims priority, application Japan, Jan. 31, 1966, 41/5,206
Int. Cl. G02b *17/00*
U.S. Cl. 350—201                     7 Claims

ABSTRACT OF THE DISCLOSURE

A compact reflector lens system of focal length F including a first positive, second negative and third positive successively arranged relatively large lenses, the third lens having a convex rear face of radius $r_6$ mirrored along its annular border to provide a first forwardly reflecting concave surface, a fourth negative small lens cemented to the second lens front face and having a mirrored concave rear face of radius $r_{10}$ to provide a rearwardly directed convex second reflecting surface, and a fifth negative lens, and a sixth positive lens positioned forwardly of and proximate the third lens and a seventh positive lens positioned rearwardly of and proximate to the third lens, the lens system satisfying the following conditions:

$$0.5F \geq a \geq 0.2F$$
$$0.3F \geq b \geq 0.15F$$
$$F/5 \leq F_{1,2,3} \leq F/2$$
$$F/1.8 \leq F_{1,2,3,(2),4,(2)} \leq F/1.0$$
$$1.0 < |r_6|/|r_{10}| < 2.5$$

wherein $a$ is the axial distance between the front face of the first lens and the image focal plane, $b$ is the axial distance between the reflecting surfaces, and $F_{1,2}\ldots, i$ is the resultant focal length of the first through the $i$th lens.

BACKGROUND OF THE INVENTION

The present invention relates generally to improvements in lens systems and it relates more particularly to an improved compact objective lens system of the type employing lenses and reflecting surfaces.

Reflector lens systems have been employed as photographic objects and possess the advantage of compactness in relationship to their focal lengths. The reflector lens systems heretofore available, while commonly suitably corrected for chromatic and other aberrations, possess an important drawback and disadvantage in the presence of high uncorrected astigmatism and curvature of field. The above defect is a consequence of the Petzval sum, whereby in order to minimize or eliminate the aforesaid defect, under the condition that the lens spacing is unaltered, the power of each lens must be reduced, or the distance between the front or first lens and the image plane be increased. Such expedients, however, would result in an increase in the size of the device thereby losing or minimizing the important feature of the reflector lens system, particularly when employed as a camera objective.

SUMMARY OF THE INVENTION

The principal object of the present invention is to provide an improved reflector lens system highly corrected for chromatic and other aberrations and particularly useful as a camera photographic objective and characterized by the substantial elimination of astigmatism and curvature of the image.

Another object of the present invention is to provide a highly compact lens system of the above nature having a reduced Petzval sum.

In a sense the present invention contemplates the provision of a reflective lens system comprising three consecutively axially spaced first, second and third lenses ($L_1$, $L_2$, $L_3$), a fourth lens ($L_4$) between said first and second lenses, said third lens having a forwardly directed first reflecting surface on the rear face and said fourth lens having a rearwardly directed reflecting surface on its front face, light rays incident on said first lens traversing paths rearwardly through said first, second and third lens and thence reflected by said first reflecting surface forwardly through said fourth lens and thence reflected rearwardly by said second reflecting surface through said fourth lens, and satisfying the following conditions:

$$0.5F \geq a \geq 0.2F$$
$$0.3F \geq b \geq 0.15F$$
$$F/5 \leq F_{1,2,3} \leq F/1.0$$
$$F/1.8 \leq F_{1,2,3,(2),4,(2)} \leq F/1.0$$
$$1.0 < |r_6|/|r_{10}| < 2.5$$

wherein:

( ) indicates a repeated traverse of the parenthesis enclosed lens by the light rays;
F is the resultant focal length of the lens system;
$F_{1,2}\ldots, i$ is the resultant focal length of the first through the $i$th lens;
$a$ is the axial distance between the front face of the first lens and the image focal plane;
$b$ is the axial distance between the first and second reflecting surfaces; and
$r_6$ and $r_{10}$ are the radii of curvature of the first and second reflecting surfaces respectively.

The last condition is important in overcoming the astigmatism and image curvature which is a drawback of the heretofore proposed reflector lens objective systems and in that it permits the achievement of a desired Petzval sum, and the negative increase of the Petzval sum produced by the first reflecting surface can be corrected by the second reflecting surface thereby reducing the effect of other aberrations.

DESCRIPTION OF THE PREFERRED EMBODIMENTS

Figure 1:
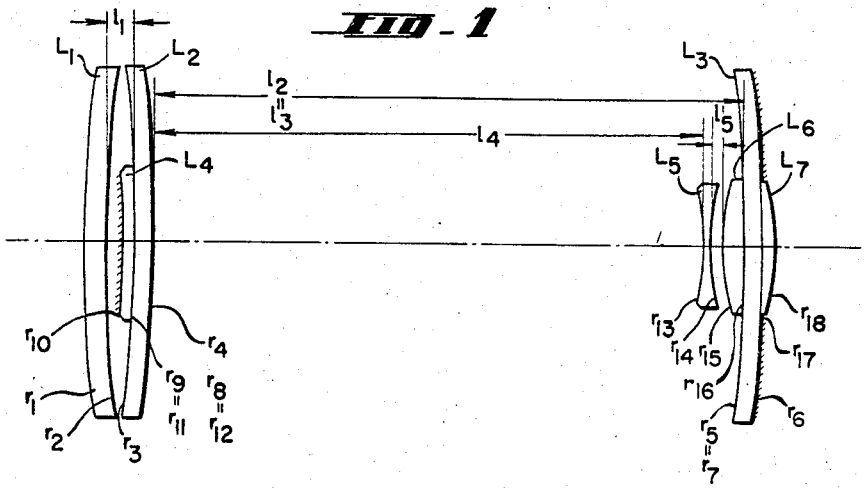
FIGURE 1 is a longitudinal medial sectional view of a lens system embodying the present invention.
Figure 2:
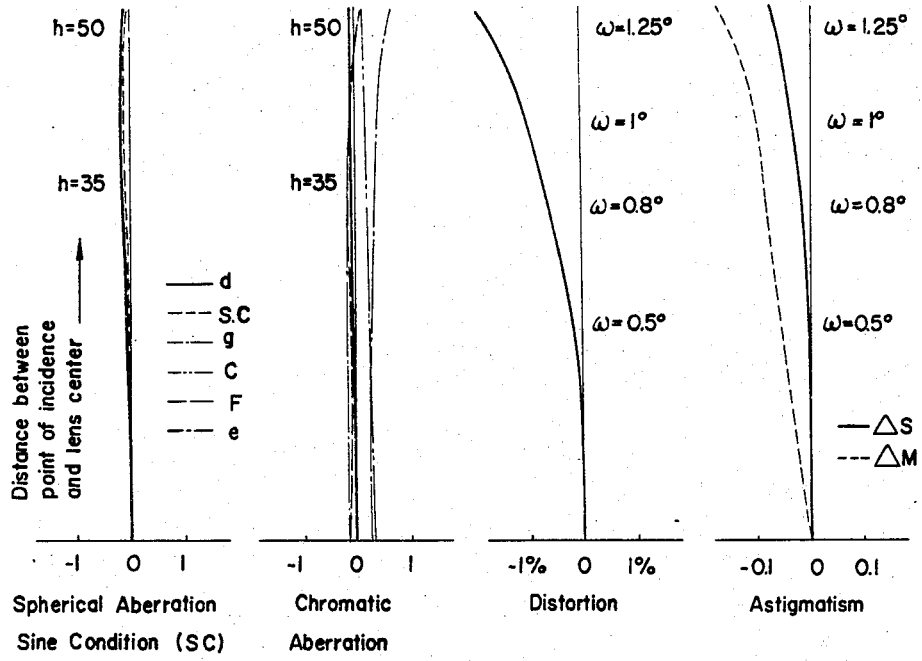
FIGURE 2 illustrates the aberration curves characterizing the lens system of FIGURE 1.

Referring now to the drawings, and particularly FIGURE 1 thereof which illustrates a preferred embodiment of the present invention, the improved lens system includes seven coaxial lenses, lenses $L_1$, $L_2$ and $L_3$ of relatively large diameter and lenses $L_4$, $L_5$, $L_6$ and $L_7$ of relatively smaller diameter. The first lens $L_1$ is positive having a front convex surface of greater curvature and of radius of curvature $r_1$, directed to the object side and a rear concave face directed to the image size and of radius of curvature $r_1$, directed to the object side and a rear concave front face of radius $r_3$ and a convex rear face of radius $r_4$, the confronting faces of lens $L_1$ and $L_2$ being axially spaced a distance $l_1$; and the third lens $L_3$ is positive with a concave front face of radius $r_5$ axially spaced a distance $l_2$ from the rear face of lens $L_2$ and with a rear convex face of radius $r_6$. The annular area of the rear face of the lens $L_3$ is mirrored to provide a forwardly directed first reflecting surface, the lens $L_3$ being transparent at its center area.

The fourth lens $L_4$ is positioned between the lenses $L_1$ and $L_2$ and has a rear face complementing and cemented to the central area of the front face of the lens $L_2$ leaving the annular area thereof free. The front face of the fourth lens $L_4$ is of radius of curvature $r_{10}$ and is mirrored to provide a rearwardly directed second reflecting surface. The fifth lens $L_5$ is positioned forward of the lens $L_3$ and is negative with a concave front face of radius of curvature $r_{13}$ axially spaced from the rear face of lens $L_2$ a distance $l_4$ and a concave rear face of radius of curvature $r_{14}$; the sixth lens $L_6$ is positioned between the lenses $L_5$ and $L_3$ and is positive with a front face of radius of curvature $r_{15}$ axially spaced from the rear face of the lens $L_5$ a distance $l_5$; and the seventh lens $L_7$ is positive with a front surface complementing and cemented to the rear unmirrored central area of the lens $L_3$, and a convex rear surface of radius $r_{18}$.

Light rays from an object incident on the lens system pass rearwardly through the first lens $L_1$ and through the second lens $L_2$, are reflected by the first reflecting surface of the third lens $L_3$, pass through the middle portion of the second lens $L_2$, are reflected by the second reflecting surface of the fourth lens $L_4$, pass again through the middle portion of the second lens $L_2$, then pass through the fifth lens $L_5$, the sixth lens $L_6$, the middle portion of the third lens $L_3$ and the seventh lens $L_7$, and finally focus on the focal plane to form the image.

Figure 3:
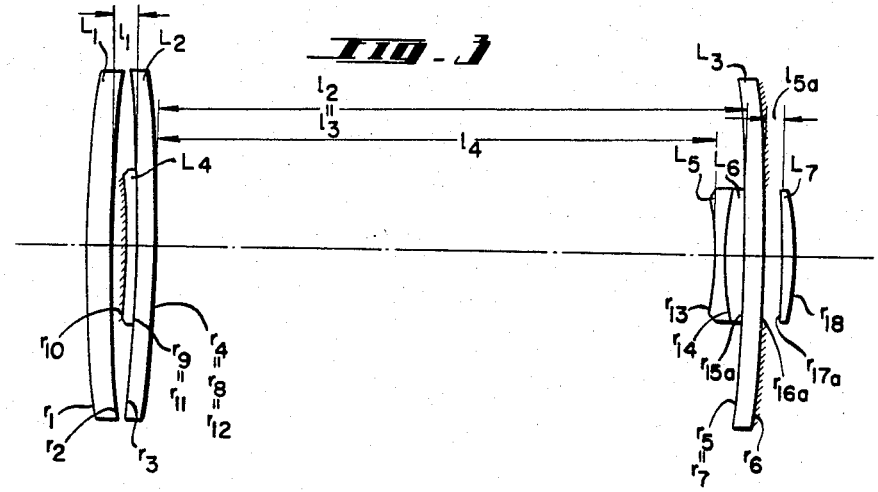
FIGURE 3 is a longitudinal medial sectional view of another lens system embodying the present invention.
Figure 4:
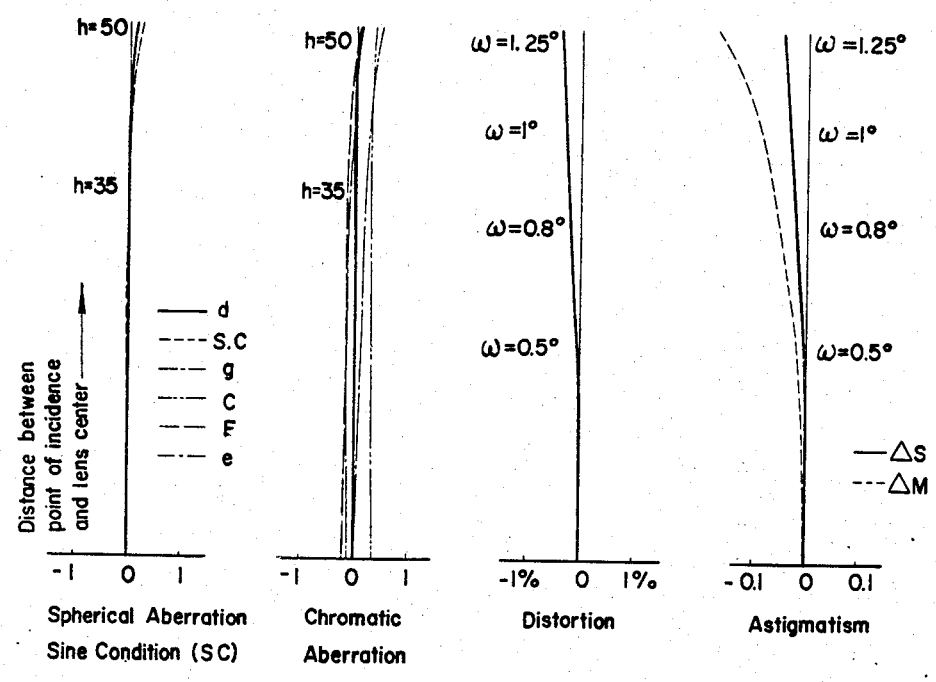
FIGURE 4 illustrates the aberration curves characterizing the lens system of FIGURE 3.
Figure 5:
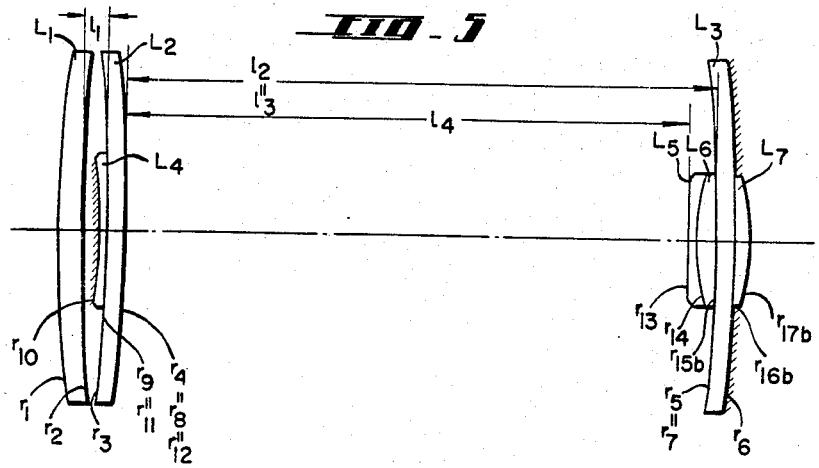
FIGURE 5 is a longitudinal medial sectional view of still another lens system embodying the present invention.
Figure 6:
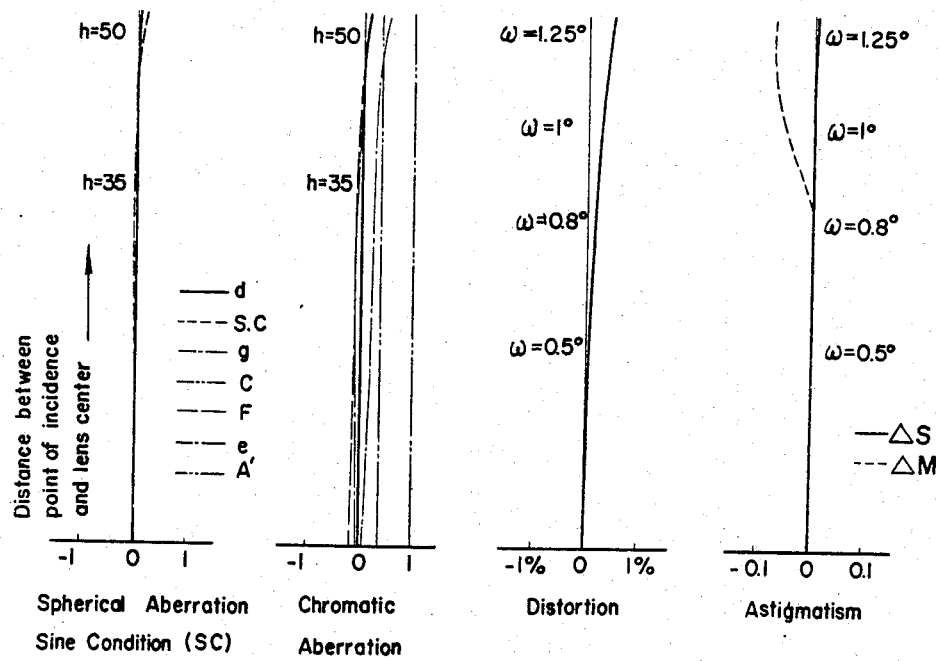
FIGURE 6 illustrates the aberration curves characterizing the lens system of FIGURE 5.

While in the example of FIGURE 1 the fifth lens $L_5$ and the sixth lens $L_6$ are separated from each other, these lenses $L_5$ and $L_6$ may also be cemented together, as shown in the examples of FIGURES 3 and 5. Also, the third lens $L_3$ and the seventh lens $L_7$ which are cemented to each other as shown in FIGURE 1 may be separated from each other as shown in FIGURE 3. Further, the positions of the third lens $L_3$ and the sixth lens $L_6$ may be interchanged. If required or desired, the middle portion of the second lens $L_2$ and the third lens $L_3$ may be apertured or hollowed out.

It should be noted that in the embodiment illustrated in FIGURE 3, the axial distance between the confronting faces of lenses $L_3$ and $L_7$ is $l_{5a}$ and the front face of the lens $L_7$ is $r_{17a}$ and in the embodiment illustrated in FIGURE 5 the rear face of lens $L_7$ is of radius of curvature $r_{17b}$.

In accordance with the present invention the lens and reflecting surfaces of the optical system described above are dimensioned and related to satisfy the following conditions:

(I)     $0.5F \geq a \geq 0.2F$
(II)     $0.3F \geq b \geq 0.15F$
(III)     $F/5 \leq F_{1,2,3} \leq F/2$
(IV)     $F/1.8 \leq F_{1,2,3,(2),4,(2)} \leq F/1.0$
(V)     $1.0 < |r_6|/|r_{10}| < 2.5$ ( ) indicates a repeatedly traversed lens, wherein F is the resultant focal length of the lens system, $F_{1,2 \ldots i}$ is the resultant focal length determined by the first to the $i$th lenses, $a$ is the axial distance between the object side vertex of front surface of the first lens $L_1$ and the image forming plane, $b$ is the axial distance between the first and the second reflecting surfaces, and $r_6$ and $r_{10}$ are the radii of curvature of the rear surface of the lens $L_3$ and the front surface of lens $L_9$ respectively.

The conditions (I), (II), (III) and (IV) define a telephoto optical system and further determine the arrangement and power distribution of the component lenses to determined the overall length of the resultant objective. The conditions (III) and (IV) are the restrictions with which chromatic aberration can be corrected under the conditions (I) and (II). These conditions are not necessarily sufficient to fully correct the aberrations due to Petzval sum. Generally, with the conditions (I), (II), (III) and (IV) only, it is difficult to avoid negative increase of Petzval sum.

The condition (V) of the optical system of the present invention corrects the negative increase of Petzval sum and makes it possible to obtain any desired Petzval sum. Thus, in the present optical system, the negative increase of Petzval sum produced by the sixth surface $r_6$ can be corrected by the tenth surface $r_{10}$, thereby diminishing the influence upon other aberrations.

In the Seidel coefficients of the example as shown in FIGURE 1, the Petzval coefficient produced by the sixth surface $r_6$ is $-2.1$, while the Petzval coefficient produced by the tenth surface $r_{10}$ is $+3.7$, which is more than is needed to correct the negative Petzval coefficient and may also be utilized to correct the negative increase of Petzval sum due to improvement of telephoto efficiency. This will be understood in view of the fact that, while the Seidel coefficients $S_1$, $S_2$ and $S_3$ of the sixth surface $r_6$ are respectively 6.9, $-2.4$ and 0.8, those of the tenth surface $r_{10}$ are of such relatively small values as $-1.9$, 1, $-0.5$.

While in conventional reflective lens systems the negative increase of Petzval sum is large due to the restrictive condition of small-size, that is, shorter whole length of the optical system, in each example of the lens system of the present invention it is possible to hold the Petzval sum to below 0.5.

The data of each illustrated example of the lens system of the present invention satisfying the above indicated conditions are as follows:

EXAMPLE 1 (Fig. 1)

| | | |
|---|---|---|
| $r_1 = 448.000$ | $d_1 = 7.00$ | $n_1 = 1.51633/64.1$ |
| $r_2 = 1751.974$ | $l_1 = 6.00$ | |
| $r_3 = -423.000$ | $d_2 = d_5 = d_8 = 5.00$ | $n_2 = 1.60717/40.2$ |
| $r_4 = -626.310$ | $l_2 = l_3 = 170.00$ | |
| $r_5 = -700.000$ | $d_3 = d_4 = d_{11} = 5.00$ | $n_3 = 1.51633/64.1$ |
| $r_6 = -625.000$ | $d_4 = d_7 = 3.00$ | $(n_3 = 1.51633/64.1)$ |
| $(r_7)r_5 = -700.000$ | $l_4 = 163.000$ | |
| $(r_8)r_4 = -626.310$ | | $(n_2 = 1.60717/40.2)$ |
| $r_9 = -423.000$ | $d_9 = 2.00$ | $n_4 = 1.60717/40.2$ |
| $r_{10} = -340.000$ | $l_5 = 3.00$ | $(n_4 = 1.60717/40.2)$ |
| $(r_{11})r_9 = -423.000$ | $d_{10} = 5.00$ | $(n_2 = 1.60717/40.2)$ |
| $(r_{12})r_4 = -626.310$ | $d_{12} = 4.00$ | |
| $r_{13} = -75.000$ | | $n_5 = 1.80416/46.6$ |
| $r_{14} = 123.305$ | | |
| $r_{15} = 100.000$ | | $n_6 = 1.74077/27.7$ |
| $(r_{16})r_5 = -700.000$ | | $(n_3 = 1.51633/64.1)$ |
| $(r_{17})r_6 = -625.000$ | | $(n_7 = 1.51633764.1)$ |
| $r_{18} = -106.721$ | | |

The Seidel coefficients are:

| | $S_1$ | $S_2$ | $S_3$ | P |
|---|---|---|---|---|
| 1 | 2.497 | 1.118 | 0.501 | 0.760 |
| 2 | 0.030 | -0.104 | 0.359 | -0.194 |
| 3 | -10.899 | 3.326 | -1.015 | -0.893 |
| 4 | 2.405 | -1.190 | 0.589 | 0.603 |
| 5 | -1.424 | 0.613 | -0.263 | -0.486 |
| 6 | 6.933 | -2.414 | 0.840 | -2.110 |
| 7 | 7.723 | -2.199 | 0.626 | -0.486 |
| 8 | -5.855 | 1.477 | -0.373 | 0.603 |
| 9 | | | | |
| 10 | -1.869 | 0.998 | -0.532 | 3.660 |
| 11 | | | | |
| 12 | 0.884 | -0.888 | 0.892 | 0.603 |
| 13 | -0.406 | -1.087 | -2.912 | -5.943 |
| 14 | 0.000 | 0.000 | -0.015 | -3.614 |
| 15 | 0.000 | 0.020 | 0.869 | 4.255 |
| 16 | 0.003 | -0.028 | 0.211 | 0.121 |
| 17 | | | | |
| 18 | 0.102 | -0.176 | 0.303 | 3.190 |
| Sum | 0.125 | -0.180 | 0.079 | 0.068 |

The Seidel coefficients are:

EXAMPLE 2 (Fig. 3)

| | | |
|---|---|---|
| $r_1 = 452.000$ | $d_1 = 7.00$ | $n_1 = 1.51633/64.1$ |
| $r_2 = 1815.213$ | $l_1 = 6.00$ | |
| $r_3 = -420.000$ | $d_2 = d_5 = d_8 = 5.00$ | $n_2 = 1.60717/40.2$ |
| $r_4 = -619.772$ | $l_2 = l_3 = 170.00$ | |
| $r_5 = -700.000$ | $d_3 = d_4 = d_{11} = 5.00$ | $n_3 = 1.51633/64.1$ |
| $r_6 = -625.000$ | $d_6 = d_7 = 3.00$ | $(n_3 = 1.60717/64.1)$ |
| $(r_7)r_5 = -700.000$ | $l_4 = 163.000$ | |
| $(r_8)r_4 = -619.772$ | $d_9 = 2.00$ | $(n_2 = 1.60717/40.2)$ |
| $r_9 = -420.000$ | $d_{10} = 5.00$ | $n_4 = 1.6071/40.2$ |
| $r_{10} = -338.000$ | $l_{5a} = 5.00$ | $(n_4 = 1.60717/40.2)$ |
| $(r_{11})r_9 = -420.000$ | $d_{12} = 4.00$ | $(n_2 = 1.60717/40.2)$ |
| $(r_{12})r_4 = -619.772$ | | |
| $r_{13} = -92.300$ | | $n_5 = 1.80416/46.6$ |
| $r_{14} = -109.125$ | | $n_6 = 1.80518/25.5$ |
| $r_{15a} = -700.000$ | | $(n_3 = 1.51633/64.1)$ |
| $r_{16a} = -625.000$ | | |
| $r_{17a} = -625.000$ | | $n_7 = 1.51633/64.1$ |
| $r_{18} = -144.255$ | | |

The Seidel coefficients are:

| | $S_1$ | $S_2$ | $S_3$ | P |
|---|---|---|---|---|
| 1 | 2.431 | 1.099 | 0.496 | 0.753 |
| 2 | 0.034 | −0.112 | 0.363 | −0.187 |
| 3 | −11.055 | 3.355 | −1.018 | −0.899 |
| 4 | 2.461 | −1.207 | 0.592 | 0.609 |
| 5 | −1.425 | 0.613 | −0.263 | −0.486 |
| 6 | 6.935 | −2.414 | 0.840 | −2.110 |
| 7 | 7.725 | −2.200 | 0.626 | −0.486 |
| 8 | −5.833 | 1.482 | −0.376 | 0.609 |
| 9 | | | | |
| 10 | −1.873 | 1.005 | −0.539 | 3.681 |
| 11 | | | | |
| 12 | 0.875 | −0.883 | 0.892 | 0.609 |
| 13 | −0.308 | −0.687 | −1.531 | −4.829 |
| 14 | 0.000 | 0.000 | −0.001 | 0.002 |
| 15 | 0.006 | −0.039 | 0.253 | 0.150 |
| 16 | 0.027 | −0.166 | 1.019 | 0.544 |
| 17 | −0.024 | 0.151 | −0.926 | −0.544 |
| 18 | 0.065 | 0.013 | 0.002 | 2.360 |
| Sum | 0.042 | 0.009 | 0.429 | −0.221 |

The Seidel coefficients are:

EXAMPLE 3 (Fig. 5)

| | | |
|---|---|---|
| $r_1 = 452.000$ | $d_1 = 7.00$ | $n_1 = 1.51633/64.1$ |
| $r_2 = 1815.213$ | $l_1 = 6.00$ | |
| $r_3 = -420.000$ | $d_2 = d_5 = d_8 = 5.00$ | $n_2 = 1.60717/40.2$ |
| $r_4 = -619.772$ | $l_2 = l_3 = 170.00$ | |
| $r_5 = -700.000$ | $d_3 = d_4 = d_{11} = 5.00$ | $n_3 = 1.516333/64.1$ |
| $r_6 = -625.000$ | $d_6 = d_7 = 3.00$ | $(n_3 = 1.51633/64.1)$ |
| $(r_7)r_5 = -700.00$ | $l_4 = 163.00$ | |
| $(r_8)r_4 = -619.872$ | $d_9 = 2.00$ | $(n_2 = 1.60717/40.2)$ |
| $r_9 = -420.000$ | $d_{10} = 5.00$ | $n_4 = 1.60717/40.2$ |
| $r_{10} = -338.000$ | $d_{12} = 4.00$ | $(n_4 = 1.60717/40.2)$ |
| $(r_{11})r_9 = -420.000$ | | $(n_2 = 1.51633/64.1)$ |
| $(r_{12})r_4 = -619.772$ | | |
| $r_{13} = -92.300$ | | $n_5 = 1.80146/46.6$ |
| $r_{14} = 109.125$ | | $n_6 = 1.80518/25.5$ |
| $r_{15b} = -700.000$ | | $(n_3 = 1.51633/64.1)$ |
| $r_{16b} = -625.000$ | | $n_7 = 1.51633/64.1$ |
| $r_{17b} = -152.991$ | | |

The Seidel coefficients are:

| | $S_1$ | $S_2$ | $S_3$ | P |
|---|---|---|---|---|
| 1 | 2.431 | 1.099 | 0.496 | 0.753 |
| 2 | 0.034 | −0.112 | 0.363 | −0.187 |
| 3 | −11.055 | 3.355 | −1.018 | −0.899 |
| 4 | 2.461 | −1.207 | 0.592 | 0.609 |
| 5 | −1.425 | 0.613 | −0.263 | −08486 |
| 6 | 6.935 | −2.414 | 0.840 | −2.110 |
| 7 | 7.725 | −2.200 | 0.626 | −0.486 |
| 8 | −5.833 | 1.482 | −0.376 | 0.609 |
| 9 | | | | |
| 10 | −1.873 | 1.005 | −0.539 | 3.681 |
| 11 | | | | |
| 12 | 0.875 | −0.883 | 0.892 | 0.609 |
| 13 | −0.308 | −0.687 | −1.531 | −4.829 |
| 14 | 0.000 | 0.000 | −0.001 | 0.002 |
| 15 | 0.006 | −0.039 | 0.253 | 0.150 |
| 16 | | | | |
| 17 | 0.071 | −0.024 | 0.008 | 2.225 |
| Sum | 0.045 | −0.013 | 0.341 | −0.356 |

In the above examples $d_1$, $d_2$, $d_3$, $d_6$, $d_9$, $d_{10}$, and $d_{12}$ are the axial thicknesses of the lenses $L_1$, $L_2$, $L_3$, $L_4$, $L_5$, $L_6$ and $L_7$, respectively, $n_n$ is the index of refraction of the subscript designated lens, the parenthesis enclosed material indicates a repeatedly traversed lens or face, and the other references are as described above and linear dimensions are in millimeters.

While there have been described and illustrated preferred embodiments of the present invention it is apparent that numerous alterations, additions and omissions may be made without departing from the spirit thereof.

What I claim is:

1. A reflector lens system comprising, consecutively axially spaced, a first positive lens ($L_1$) and a negative second lens ($L_2$), and a third positive lens ($L_3$) with a convex rear face having a forwardly directed first reflecting surface located on the annular border thereof to leave the center thereof transparent, a fourth lens ($L_4$) of lesser diameter than and located between said first and second lenses and having a rearwardly directed second reflecting surface on its front face and a rear face complementing and cemented to the front face of said second lens whereby to permit zonal transmission of light through the outer portions of said first and second lenses and whereby light rays incident on said first lens traverse a path rearwardly through the outer portions of said first, second and third lenses and are thence reflected by said first reflecting surface forwardly through only the central portion of said second lens and through said fourth lens and are thence reflected by said second reflecting surface rearwardly through said fourth lens, a negative fifth lens ($L_5$) and a following positive sixth lens ($L_6$) of lesser diameter than and positioned forwardly of and proximate to said third lens, and a positive seventh lens ($L_7$) of smaller diameter than and positioned rearwardly of and proximate said third lens.

2. The lens system of claim 1 wherein the confronting faces of said fifth and sixth lenses are complementary and mated.

3. The lens system of claim 1 wherein the confronting faces of said third and seventh lenses are complementary and mated.

4. The lens system of claim 1 wherein the confronting faces of said third and sixth lenses are complementary and mated.

5. The lens system of claim 1 wherein the confronting faces of said third and seventh lenses are complementary and mated and the confronting faces of said third and sixth lenses are complementary and mated, and possessing the following dimensions and relationships:

EXAMPLE 1 (Fig. 1)

| | | |
|---|---|---|
| $r_1 = 448.000$ | $d_1 = 7.00$ | $n_1 = 1.51633/64.1$ |
| $r_2 = 1751.974$ | $l_1 = 6.00$ | |
| $r_3 = -423.000$ | $d_2 = d_5 = d_8 = 5.00$ | $n_2 = 1.60717/40.2$ |
| $r_4 = -626.310$ | $l_2 = l_3 = 170.00$ | |
| $r_5 = -700.000$ | $d_3 = d_4 = d_{11} = 5.00$ | $n_3 = 1.51633/64.1$ |
| $r_6 = -625.000$ | $d_4 = d_7 = 3.00$ | $(n_3 = 1.51633/64.1)$ |
| $(r_7)r_5 = -700.000$ | $l_4 = 163.000$ | |
| $(r_7)r_4 = -626.310$ | | $(n_2 = 1.60717/40.2)$ |
| $r_9 = -423.000$ | $d_9 = 2.00$ | $n_4 = 1.60717/40.2$ |
| $r_{10} = -340.000$ | $l_5 = 3.00$ | $(n_4 = 1.60717/40.2)$ |
| $(r_{11})r_9 = -423.000$ | $d_{10} = 5.00$ | $(n_2 = 1.60717/40.2)$ |
| $(r_{12})r_4 = -626.310$ | $d_{12} = 4.00$ | |
| $r_{13} = -75.000$ | | $n_5 = 1.80416/46.6$ |
| $r_{14} = 123.305$ | | |
| $r_{15} = 100.000$ | | $n_6 = 1.74077/27.7$ |
| $(r_{16})r_5 = -700.000$ | | $(n_3 = 1.51633/64.1)$ |
| $(r_{17})r_6 = -625.000$ | | $(n_7 = 1.51633/64.1)$ |
| $r_{18} = -106.721$ | | | wherein $r_1$ to $r_6$ are the radii of curvature of the successive faces of said first to third lenses, $r_9$ and $r_{10}$ are the radii of curvature of the rear and front faces respectively of said fourth lens, $r_{13}$ and $r_{14}$ are the radii of curvature respectively of the front and rear faces of said fifth lens, $r_{15}$ is the radius of curvature of the front face of said sixth lens and $r_{18}$ the radius of curvature of the rear face of said seventh lens, $d_1$, $d_2$, $d_3$, $d_6$, $d_9$, $d_{10}$, $d_{12}$ are the thicknesses of said first to seventh lenses respectively; $l_1$, $l_2$, $l_4$ and $l_5$ are the spacings respectively between lenses $L_1$ and $L_2$, $L_2$ and $L_3$, $L_2$ and $L_5$, and $L_5$ and $L_6$; and $n_n$ are the indices of refraction and the Abbe values of the subscript designated lenses.

6. The lens system of claim 1 wherein the confronting faces of said sixth and third lenses and the confronting faces of said fifth and sixth lenses are complementary and mated, and possessing the following dimensions and relationships:

EXAMPLE 2 (Fig. 3)

| | | |
|---|---|---|
| $r_1 = 452.000$ | $d_1 = 7.00$ | $n_1 = 1.51633/64.1$ |
| $r_2 = 1815.213$ | $l_1 = 6.00$ | |
| $r_3 = -420.000$ | $d_2 = d_5 = d_8 = 5.00$ | $n_2 = 1.60717/40.2$ |
| $r_4 = -619.772$ | $l_2 = l_3 = 170.00$ | |
| $r_5 = -700.000$ | $d_3 = d_4 = d_{11} = 5.00$ | $n_3 = 1.51633/64.1$ |
| $r_6 = -625.000$ | $d_6 = d_7 = 3.00$ | $(n_3 = 1.51633/64.1)$ |
| $(r_7)r_5 = -700.000$ | $l_4 = 163.000$ | |
| $(r_8)r_4 = -619.772$ | $d_9 = 2.00$ | $(n_2 = 1.60717/40.2)$ |
| $r_9 = -420.000$ | $d_{10} = 5.00$ | $n_4 = 1.6107/40.2$ |
| $r_{10} = -338.000$ | $l5a = 5.00$ | $(n_4 = 1.60717/40.2)$ |
| $(r_{11})r_9 = -420.000$ | $d_{12} = 4.00$ | $(n^2 = 1.60717/40.2)$ |
| $(r_{12})r_4 = -619.772$ | | |
| $r_{13} = -92.300$ | | $n_5 = 1.80416/46.6$ |
| $r_{14} = -109.125$ | | $n_6 = 1.80518/25.5$ |
| $r_{15a} = -700.000$ | | $(n_3 = 1.51633/64.1)$ |
| $r_{16a} = -625.000$ | | |
| $r_{17a} = -625.000$ | | $n_7 = 1.51633/64.1$ |
| $r_{18} = -144.255$ | | | wherein $r_1$ to $r_6$ are the radii of curvature of the successive faces of said first to third lenses, $r_9$ and $r_{10}$ are the radii of curvature of the rear and front faces respectively of said fourth lens, $r_{13}$ and $r_{14}$ are the radii of curvature respectively of the front and rear faces of said fifth lens, and $r_{17a}$ and $r_{18}$ are the radii of curvature respectively of the front and rear faces of said seventh lens; $d_1$, $d_2$, $d_3$, $d_6$, $d_9$, $d_{10}$, $d_{12}$ are the thicknesses of said first to seventh lenses respectively; $l_1$, $l_2$, $l_4$ and $l_{5a}$ are the spacings respectively between lenses $L_1$ and $L_2$, $L_2$ and $L_3$, and $L_3$ and $L_7$; and $n_n$ are the indices of refraction and the Abbe values of the subscript designated lenses.

7. The lens system of claim 1, wherein the confronting faces of said fifth and sixth lenses and of said sixth and third lenses and of said third and seventh lenses respectively are complementary and mated, and possessing the following dimensions and relationships:

EXAMPLE 3 (Fig. 5)

| | | |
|---|---|---|
| $r_1 = 452.000$ | $d_1 = 7.00$ | $n_1 = 1.51633/64.1$ |
| $r_2 = 1815.213$ | $l_1 = 6.00$ | |
| $r_3 = -420.000$ | $d_2 = d_5 = d_8 = 5.00$ | $n_2 = 1.60717/40.2$ |
| $r_4 = -619.772$ | $l_2 = l_3 = 170.00$ | |
| $r_5 = -700.000$ | $d_3 = d_4 = d_{11} = 5.00$ | $n_3 = 1.516333/64.1$ |
| $r_6 = -625.000$ | $d_6 = d_7 = 3.00$ | $(n_3 = 1.51633/64.1)$ |
| $(r_7)r_5 = -700.00$ | $l_4 = 163.00$ | |
| $(r_8)r_4 = -619.872$ | $d_9 = 2.00$ | $(n_2 = 1.60717/40.2)$ |
| $r_9 = -420.000$ | $d_{10} = 5.00$ | $n_4 = 1.60717/40.2$ |
| $r_{10} = -338.000$ | $d_{12} = 4.00$ | $(n_4 = 1.60717/40.2)$ |
| $(r_{11})r_9 = -420.000$ | | $(n_2 = 1.51633/64.1)$ |
| $(r_{12})r_4 = -619.772$ | | |
| $r_{13} = -92.300$ | | $n_5 = 1.80416/46.6$ |
| $r_{14} = 109.125$ | | $n_6 = 1.80518/25.5$ |
| $r_{15b} = -700.000$ | | $(n_3 = 1.51633/64.1)$ |
| $r_{16b} = -625.000$ | | $n_7 = 1.51633/64.1$ |
| $r_{17b} = -152.991$ | | | wherein $r_1$ to $r_6$ are the radii of curvature of the successive faces of said first to third lenses, $r_9$ and $r_{10}$ are the radii of curvature of the rear and front faces respectively of said fourth lens, $r_{13}$ and $r_{14}$ are the radii of curvature respectively of the front and rear faces of said fifth lens, and $r_{17b}$ is the radius of curvature of the rear face of said seventh lens; $d_1$, $d_2$, $d_3$, $d_6$, $d_9$, $d_{10}$, $d_{12}$ are the thicknesses of said first to seventh lenses respectively; $l_1$, $l_2$ and $l_4$ are the spacings respectively between lenses $L_1$ and $L_2$, $L_2$ and $L_3$, and $L_2$ and $L_5$; and $n_n$ are the indices of refraction and the Abbe values of the subscript designated lenses.

References Cited

UNITED STATES PATENTS 2,726,574   12/1955   Mandler _____ 350—199
2,730,013   1/1956   Mandler _____ 350—201

JOHN K. CORBIN, Primary Examiner